(12) United States Patent
Racz et al.

(10) Patent No.: US 8,233,436 B2
(45) Date of Patent: Jul. 31, 2012

(54) RNC CAPACITY LICENSING

(75) Inventors: Sandor Racz, Cegléd (HU); Szilveszter Nádas, Budapest (HU); Mats Zachrison, Örebro (SE); Wenbiao Wu, Vallentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 404 days.

(21) Appl. No.: 12/525,753

(22) PCT Filed: Feb. 8, 2007

(86) PCT No.: PCT/EP2007/051218
§ 371 (c)(1),
(2), (4) Date: Aug. 4, 2009

(87) PCT Pub. No.: WO2008/095537
PCT Pub. Date: Aug. 14, 2008

(65) Prior Publication Data
US 2010/0097930 A1    Apr. 22, 2010

(51) Int. Cl.
*H04Q 7/00*    (2006.01)

(52) U.S. Cl. .................. 370/328; 370/411; 455/432.1

(58) Field of Classification Search .................. None
See application file for complete search history.

(56) References Cited

U.S. PATENT DOCUMENTS

| | | | |
|---|---|---|---|
| 2003/0073437 A1* | 4/2003 | Yuen | 455/432 |
| 2004/0071086 A1* | 4/2004 | Haumont et al. | 370/230 |
| 2004/0071095 A1* | 4/2004 | Raisanen | 370/252 |
| 2006/0034168 A1* | 2/2006 | Bakker et al. | 370/229 |

FOREIGN PATENT DOCUMENTS

| | | |
|---|---|---|
| WO | WO 00/38348 A | 6/2000 |
| WO | WO 2004/004250 A | 1/2004 |

* cited by examiner

*Primary Examiner* — Yemane Mesfin
*Assistant Examiner* — Wanda Z Russell (57) ABSTRACT

A method of controlling the rate of traffic flow through an Iub interface of a Radio Network Controller is described. The method includes obtaining a licensed rate, which defines the maximum throughput permitted through the Iub interface, at the Radio Network Controller. The rate of traffic flow through the Iub interface and all Iu interfaces of the Radio Network Controller is measured, and the extent to which packet switched traffic flow through the Iub interface exceeds the licensed rate identified. If the packet switched traffic flow through the Iub interface exceeds the licensed rate, packets are dropped from traffic flow through the Iub interface to reduce the traffic flow to the licensed rate.

30 Claims, 6 Drawing Sheets

RNC CAPACITY LICENSING

FIELD OF THE INVENTION

The present invention relates to a method for licensing RNC capacity, and in particular to a system for ensuring that Iub throughput does not exceed a licensed rate.

BACKGROUND TO THE INVENTION

Advances in computing and networking technology have led to the development of new and increasingly complex communications networks. Today, for example, systems such as the Universal Mobile Telecommunications System (UMTS) seek to provide mobile phones, personal computers, and other computing devices with wireless access to the Internet and other networks.

Figure 1:
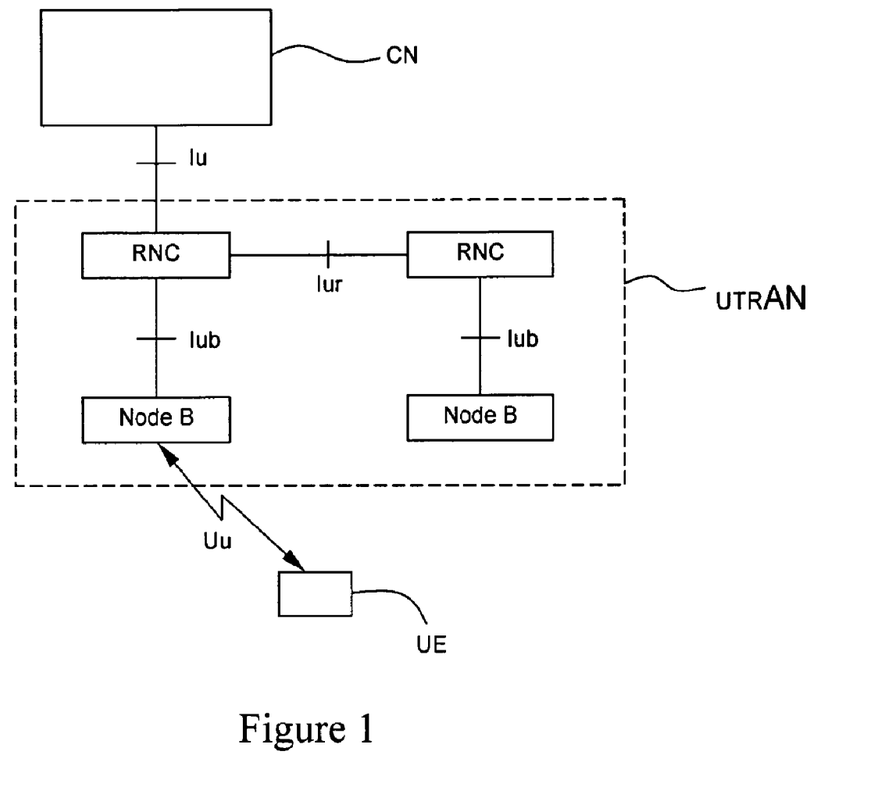
FIG. 1 is a schematic illustration of a UMTS network.

FIG. 1 is a schematic diagram of a UMTS network. As shown in FIG. 1, a mobile radio network generally includes a set of base stations and base station controllers. In the UMTS, this network is called the UMTS Terrestrial Radio Access Network (UTRAN), a base station is called a Node B, and a base station controller is called a Radio Network Controller (RNC).

The UTRAN communicates both with mobile terminals, known as User Equipments (UE), via a Uu interface, and with a Core Network (CN) via an Iu interface. As shown in FIG. 1, the RNCs are connected:

to the Node B via an Iub interface;
to each other via an Iur interface; and
to the Core Network CN via an Iu interface.

The core network CN typically includes equipment for performing circuit and packet switching. For example, the core network CN may include one or more mobile switching centres (MSCs) (not shown) for enabling communication over the public switched telephone network (PSTN). The core network CN may also include a gateway general packet radio service (GPRS) support node (GGSN) (not shown) for interfacing to external packet-based networks such as the Internet. The interface between the RNCs and the MSC is known as Iu-cs, and the interface between the RNCs and the GGSN is Iu-ps.

The resource allocation within the system is important to maintain the flow of traffic. It is typical for two parties (such as an operator and the seller of the RNC) to describe, in a "Service Level Agreement" (SLA), the conditions for flow rates across interfaces. For example, the SLA may indicate that the operator has bought 50 Mbps Iub-max capacity (i.e. he has agreed that the maximum throughput across the Iub should not exceed 50 Mbps). The seller of the RNC may well provide more Iub capacity than the required 50 Mbps, but the traffic must be limited below the agreed capacity. The SLA is thus not usually enforced by the limitations of the hardware. The preferred solution is to provide more powerful hardware and enforce the SLA using software.

In many cases there is no direct mapping between the SLA and the required hardware. For example, aggregate Iub throughput (Iub-max) may be sold, but each RNC is connected to several RBSs through the Iub transport network. When the Iub Transport Network is dimensioned for this throughput, then the total peak capacity of Iub must be larger than the licensed capacity, because of spatial variation of the traffic. At the same time, the sum throughput of the interfaces must also be limited to ensure that the license level is not exceeded. In addition, the Iub transport network is owned by the operator and can easily be upgraded. A specific software solution for this purpose is desirable to enforce the limit.

There are two ways of limiting the throughput of an interface: shaping and policing. In the case of shaping, buffering is used, and the serving rate of the buffer is set to the required maximal throughput. In the case of policing, the out-of-profile packets are dropped without any buffering.

Where shaping is used, the packet delay is increased by buffering when the traffic is saturated. Self-clocking protocols such as the Transmission Control Protocol (TCP) can react on this delay increase by rate reduction, and in this way resolve the congested situation. This buffering method is used in IP routers and is TCP friendly by nature.

In some situations buffering is not allowed, or extra buffering delays to the in-profile packets are not desirable. In these situations shaping cannot be used and the throughput must be limited by policing. Several policing methods exist: one example is the Committed Access Rate (CAR) method of Cisco.

It is desirable to license RNC capacity so that it can operate with more than one interface. This requires that the sum throughput of more than one interface should be limited. For example, if an operator has a license for 50 Mbps Iub capacity, but three 100 Mbps cards installed, the aggregate traffic should still be regulated below 50 Mbps. This requires a distributed RNC capacity licensing algorithm. The actual traffic on the involved interfaces must be measured. Action may then be taken, based on these measurements, to force the licensed capacity.

STATEMENT OF THE INVENTION

In accordance with one aspect of the present invention there is provided a method of controlling the rate of traffic flow through an Iub interface of a Radio Network Controller, the method comprising:

obtaining a licensed rate at the Radio Network Controller, the licensed rate defining the maximum throughput permitted through the Iub interface;

measuring the rate of traffic flow through the Iub interface and all Iu interfaces of the Radio Network Controller;

identifying the extent to which packet switched traffic flow through the Iub interface exceeds the licensed rate; and if the packet switched traffic flow through the Iub interface exceeds the licensed rate, dropping packets from traffic flow through the Iub interface to reduce the traffic flow to the licensed rate.

Since the total throughput (through the Iu interfaces as well as the Iub interface) is measured the RNC can determine the correct goal for the decrease in traffic. Preferably Iu-cs and Iu-ps traffic are distinguished in the measurement. The Radio Network Controller then preferably reduces traffic flow through the Iub interface by a factor determined by $$\min\left(1, \frac{Iub - allowedLevel}{Iub} * \frac{Iu_{cs} + Iu_{ps}}{Iu_{ps}}\right)$$

where Iub, $Iu_{cs}$ and $Iu_{ps}$ are Iub, Iu-cs and Iu-ps traffic throughput levels respectively and allowedLevel is the licensed rate.

The step of measuring the rate of traffic flow through the Iub and all Iu interfaces is preferably carried out at periodic measurement intervals. If the rate of traffic flow through the Iub interface drops below the licensed rate, packets may continue to be dropped from the traffic flow through the Iub interface to reduce the traffic flow for a predetermined number of measurement intervals. This helps prevent oscillation in the control loop.

The procedure for dropping packets are dropped from traffic flow through the Iub interface preferably involves a policing method based on a virtual buffer. Upper and lower limits may be defined for occupancy of the virtual buffer, the lower limit determined from a target rate based on the extent to which the traffic flow through the Iub interface exceeds the licensed rate.

Preferably the virtual buffer occupancy is set to the lower limit when a decision is made that traffic flow should be reduced. The virtual buffer occupancy may be increased whenever a packet is forwarded, the increase in occupancy corresponding to the size of the packet. The virtual buffer occupancy is preferably decreased from a timer pulse by a factor determined by the period of the timer pulse multiplied by the target rate.

The packet dropping decision is preferably based on a moving average for the virtual buffer occupancy, which is updated every time the virtual buffer occupancy changes. When a packet arrives at the Radio Network Controller, the packet is preferably forwarded if the moving average is smaller than the lower limit. The packet is preferably dropped if the moving average is larger than the upper limit. If the moving average is between the lower and upper limits, the packet is preferably dropped with a probability determined by the extent to which the moving average of the buffer occupancy is higher than the lower limit, although packets below a predetermined size (e.g. 200 bytes) are preferably dropped only if the moving average is larger than the upper limit.

Preferably the licensed rate obtained by the Radio Network Controller is modifiable by a capacity controller. The licensed rate may be obtained by the Radio Network Controller by subscribing to a licence key. For example, In accordance with another aspect of the present invention there is provided a Radio Network Controller comprising:
  a rate determining means for obtaining a licensed rate, the licensed rate defining the maximum throughput permitted through an Iub interface of the Radio Network Controller;
  a traffic flow rate measuring means for measuring the rate of traffic flow through the Iub interface and all Iu interfaces of the Radio Network Controller;
  a processing means for identifying the extent to which packet switched traffic flow through the Iub interface exceeds the licensed rate; and
  policing means for dropping packets from traffic flow through the Iub interface to reduce the traffic flow to the licensed rate if the packet switched traffic flow through the Iub interface exceeds the licensed rate.

DETAILED DESCRIPTION OF THE PREFERRED EMBODIMENT

Figure 2:
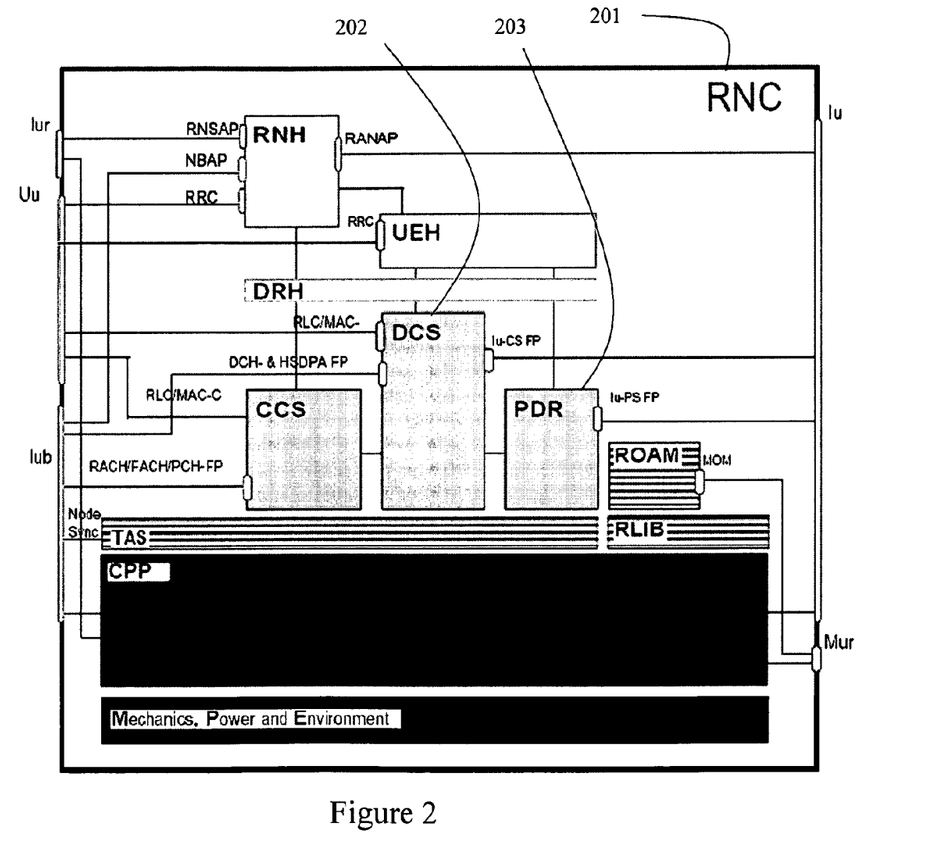
FIG. 2 is a schematic illustration of the subsystems of an RNC.

FIG. 2 illustrates subsystems in a typical RNC 201. It will be noted that the RNC includes at least one Dedicated Channel Subsystem (DCS) 202. All of the traffic passing through the Iu and Iub interfaces passes through the DCS 202. The RNC also includes at least one Packet Data Router (PDR) 203. Packet switched traffic (i.e. traffic passing through the Iu-ps interface) passes through the PDR 203.

Figure 3:
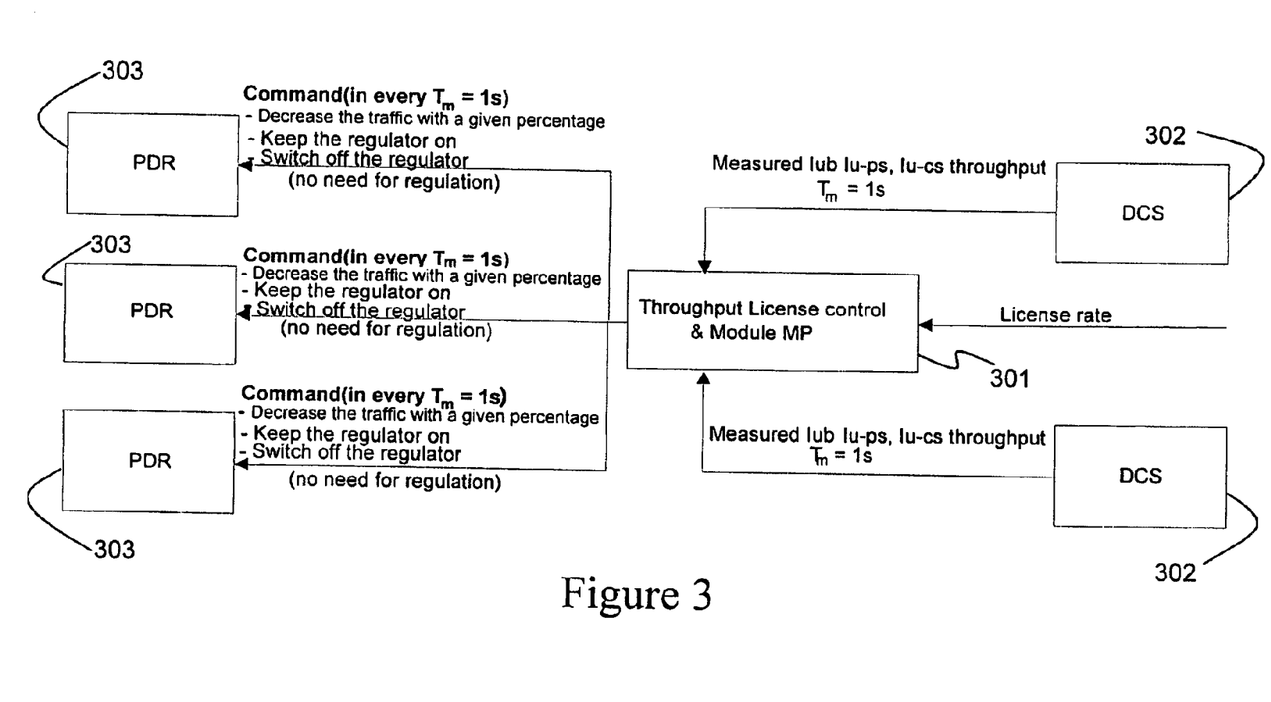
FIG. 3 illustrates a method for controlling traffic flow in line with a licensed throughput rate.

FIG. 3 illustrates a method usable in a situation where an operator has licensed a particular Iub capacity, but the sum of the available capacity is higher than the licensed capacity. A "central entity" 301 of the RNC is informed of the licensed capacity. The central entity can be thought of as a capacity mode of the RNC, and acts as a throughput licence control. The total traffic of all involved interfaces in both directions is measured via DCSs 302, and this information is provided to the central entity 301 at predetermined measurement periods, e.g. once per second. The central entity 301 compares the licensed rate with the total traffic, and decides whether or not traffic reduction is required. If traffic reduction is required, the central entity orders each PDR 303 to decrease its traffic by a given percentage (identified as "decreaseFactor") which is calculated from the measured traffic. Each PDR reduces traffic by policing, i.e. out-of-profile packets are dropped without any buffering, as explained above. Since there are no buffers in PDRs, only packet drop is possible.

In the central entity 301, hysteresis (described below) is employed to reduce the oscillation in the control-loop (i.e. reduce the number of switch on/off regulation in PDRs). Furthermore, the central entity 301 continues to instruct the PDRs 303 to regulate their traffic until the total traffic has been below the licensed level for several (e.g. 5) measurement periods. This also reduces the oscillation in the control-loop.

Thus, once per measurement period, the central entity receives from the DCSs the measured throughput in each interface, and issues one of three commands to each PDR:
(1) Decrease traffic by a fixed percentage (decreaseFactor);
(2) Continue to regulate traffic at reduced rate; or
(3) Cease regulation.

Each PDR 303 applies a virtual-buffer based policing (i.e. token-bucket based policing) and RED dropping (described below) to make the dropping pattern more random.

Since the regulation at capacity over licensed level will be carried out by the PDR (i.e. on the Iu-ps) only, it is not enough for the central entity 301 to know only the Iub throughput. For example, suppose the central entity 301 calculates that the Iub throughput is 10% too high and it tells the PDR to reduce its traffic by 10%. The PDR reduces the low priority Packet Switched (PS) and High Speed (HS) Radio Access Bearers (RAB)s by 10% of its total volume. However, the total traffic may include both PS and Circuit Switched (CS) traffic. It may therefore be the case that PS/HS RABs and PS Streaming are only 50% of the total traffic. In this case, only 5% reduction will take place for the example described. Therefore the central entity also needs to know the total Iu throughput (both Iu-cs and Iu-ps, since the regulation will apply to traffic passing through Iu-ps only) in order to set the correct relative decreasing goal for each PDR.

Once both the Iub and Iu throughput are known, the central entity 301 can then calculate the relative PS part in the total traffic and decides how much each PDR should decrease its traffic volume to meet the goal on Iub level. For example, at traffic above the licensed level, each PDR should decrease its volume by:

$$\min\left(1, \frac{Iub - allowedLevel}{Iub} * \frac{Iu_{cs} + Iu_{ps}}{Iu_{ps}}\right)$$

where Iub, $Iu_{cs}$ and $Iu_{ps}$ are node level Iub, Iu-cs and Iu-ps throughput respectively.

Iub/Iu throughput may be measured by the DCS in a similar manner to that currently used to handle Performance Monitoring (PM) counters. The volume of Dedicated Channel (DCH) traffic can be measured in DcsIub before the various PM counters are stepped. The volume of High Speed Channel (HS) and Common Channel (CCH) traffic can be measured in DcsMacD. The combined traffic volume from each SP board is reported to module Measurement Points (MPs) in certain intervals. The setting of this interval is discussed later. After getting these reports, module MPs will in turn report the volume to central MP.

Figure 4:
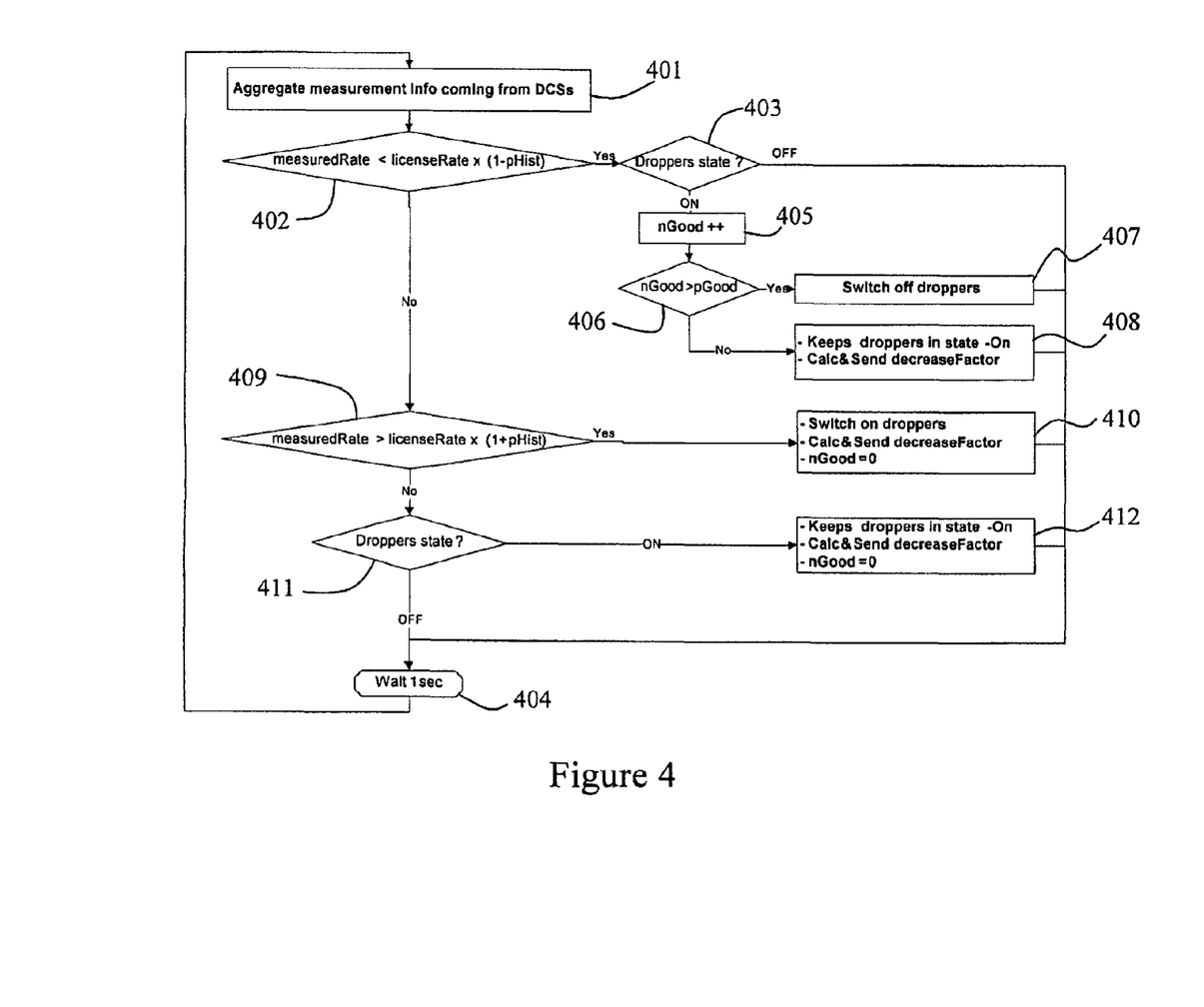
FIG. 4 is a flow chart illustrating the functionality of a central entity operating throughput licence control.

FIG. 4 illustrates the steps carried out by the central entity (throughput licence control) 301. Once the measured throughput from the Iu and Iub interfaces is received 401 from the DCSs, the measured rate is compared 402 to the license rate modified by a factor (1−pHist). pHist is a parameter of the method, which may be set by the operator, or may be a constant. If the measured rate is below the threshold, the PDRs are checked 403 to see if they are currently dropping packets. If they are not currently dropping packets then the process finishes and waits 404 for one second, before receiving 401 the next set of measurements from the DCSs. If the PDRs are dropping packets, then a parameter of the method "nGood" is increased 405 and compared 406 to another parameter "pGood". pGood may be set by the operator, or may be a constant, and sets the number of consecutive measurement intervals for which the measured rate is below the threshold before the PDRs stop dropping packets. If enough intervals have passed with the rate below the threshold (i.e. nGood>pGood), then the PDRs stop dropping packets 408. If the measured rate has dropped below the threshold temporarily (e.g. only one measurement was below it) then nGood is not greater than pGood and the PDR continues to drop packets 408.

If the measured rate is greater than the threshold, it is then compared 409 to a higher threshold determined by the license rate modified by the factor (1+pHist). If it is higher than this second threshold then the PDRs are instructed 410 to begin dropping packets, and the parameter nGood is set to zero. The measured rate must then drop below the lower threshold (licenseRate×(1−pHist)) for at least pGood measurement intervals for the PDRs to stop dropping packets.

If the measured rate is between the lower and higher thresholds (i.e. (licenseRate×(1−pHist))<measuredRate<(licenseRate×(1+pHist))), then the PDRs are checked 407 to see if they are dropping packets. If they are not, then they do not start to drop packets. The process finishes and waits 404 for one second, before receiving 401 the next set of measurements from the DCSs. If they are currently dropping packets then they continue to do so 412, but nGood is set to zero so that the measured rate must still drop below the lower threshold (licenseRate×(1−pHist)) for at least pGood measurement intervals for the PDRs to stop dropping packets. The use of the parameter pHist provides a degree of hysteresis in the process to reduce oscillation of turning the PDR packet dropping on and off when the measured rate is at or near the licensed rate.

Figure 5:
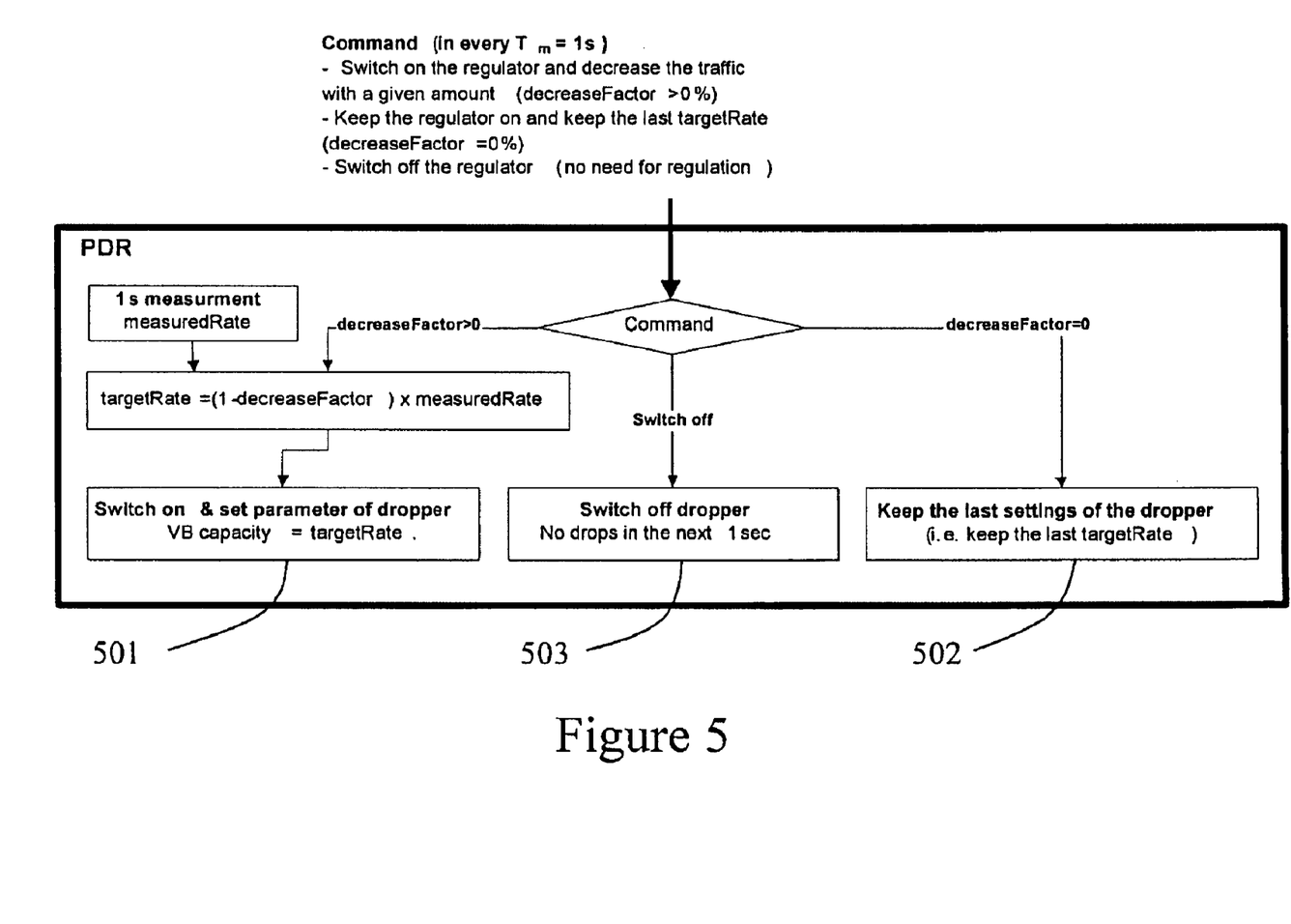
FIG. 5 illustrates the operations involved in dropping packets to reduce flow rate.
Figure 6:
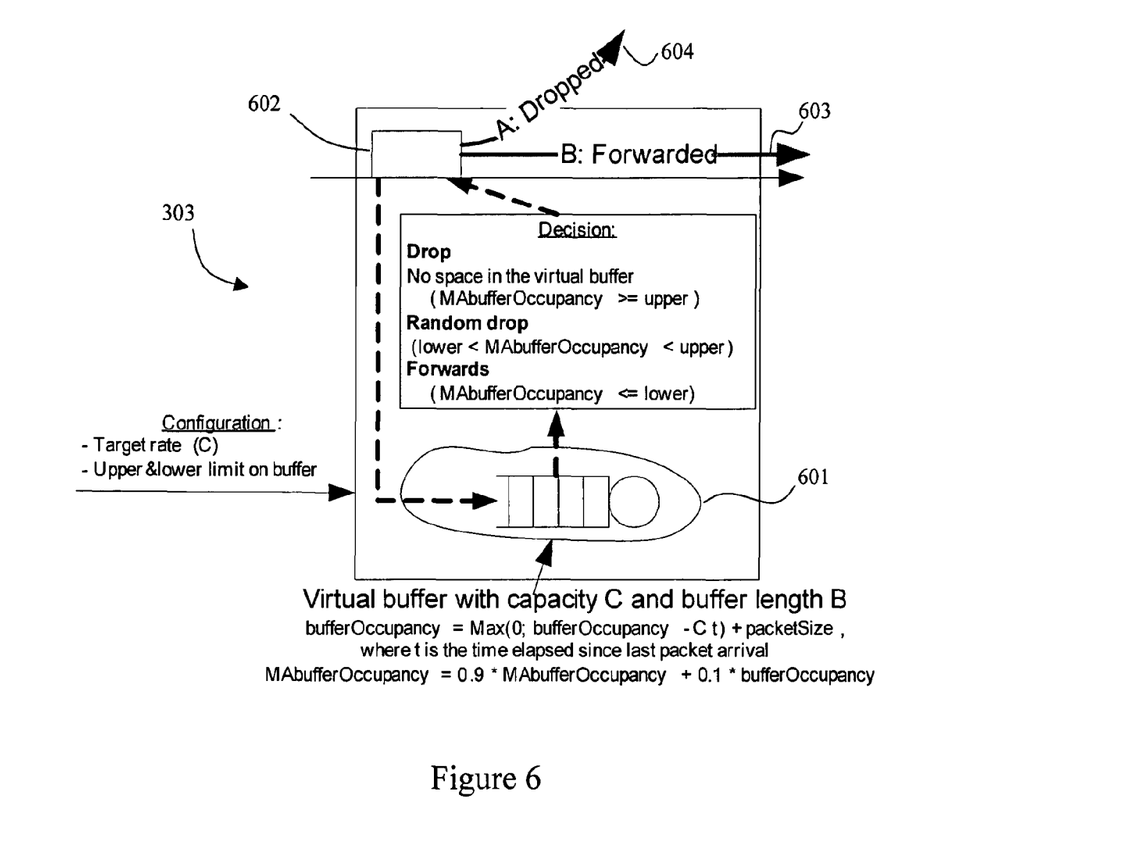
FIG. 6 is a schematic illustration of a virtual buffer procedure for dropping packets.

FIGS. 5 and 6 illustrate the operation carried out by the PDRs 303 following instructions from the central entity 301. When the decreaseFactor is greater than zero, a target throughput (targetRate) is determined, based on the measured throughput (measuredRate) modified by the decreaseFactor. Packets are then dropped 501 to bring the throughput into line with the targetRate. When the decreaseFactor is zero, the PDR continues to operate 502 to drop packets based on the previous parameter settings (i.e. the targetRate is not modified). If the instructions are to "switch off" then no packets are dropped 503.

Thus each PDR 303 has two states:
(1) Regulation is ON. In this state the virtual buffer based dropper is working.
(2) Regulation is OFF. The dropper is switched off, i.e. all packets are forwarded.

In this state there is no need to update the virtual buffer at all.

Each PDR 303 uses a virtual buffer 601 with capacity C and buffer length B. The virtual buffer occupancy is described by a parameter called "bufferOccupancy". A moving average of bufferOccupancy is also determined, and described by parameter "MAbufferOccupancy". MAbufferOccupancy is updated whenever the bufferOccupancy is changed, and the update proceeds as MAbufferOccupancy=0.9 MAbufferOccupancy+0.1 bufferOccupancy. The PDR 303 is configured with time parameters identified as "upper" and "lower" which (when combined with the targetRate) correspond to upper and lower limits on the MAbufferOccupancy. A suitable value for "lower" might be 0.3 seconds.

When the dropper is switched on (OFF→ON), the bufferOccupancy and MAbufferOccupancy are set to "targetRate× lower", where targetRate is calculated from the latest measuredRate and decreaseFator (as described above).

The bufferOccupancy is increased by the packet size whenever a packet is forwarded. In other words, dropped packets do not increase bufferOccupancy.

The PDR 303 also uses a timer with a suitable period (e.g. 20 ms). The bufferOccupancy is periodically decreased by "targetRate×20 ms" and the maximum of 0 and bufferOccupancy is determined (i.e. the bufferOccupancy is prevented from dropping below zero). There is a higher probability of packets being dropped at the end of each 20 ms interval, but this is not a problem from the perspective of the end-user. There is a small probability that a user is synchronized to this 20 ms and does not have delay variance.

When a packet 602 arrives, if the MAbufferOccupancy is smaller than the lower limit in bits (lower×targetRate) then the packet is forwarded 603. If the MAbufferOccupancy is larger than the upper limit then the packet is dropped 604.

When the MAbufferOccupancy is between the lower and upper limits then the packet is dropped (provided it is larger than 200 bytes) with a probability determined by pr= (MAbufferOccupancy−lower limit)/(upper limit−lower limit). This is the RED method alluded to above.

In order to carry this out a random number, denoted by r, is generated between 0 and 1. Then
if r<=pr then drop packet
if r>pr then forward packet.

Small control packets (i.e. IP packet size<200 byte) are only dropped when "MAbufferOccupancy>upper".

When a new decreaseFactor is received from the central entity 201, the targetRate changes as described above. The lower and upper limits in bits are then calculated from the new targetRate. The bufferOccupancy is unaffected by the change in targetRate.

There is no difference between the handling of TCP and User Datagram Protocol (UDP) packets. Packets are distinguished on the basis of their size only, and there is no need to look into the headers. As previously mentioned, packets smaller than 200 bytes are dropped only when the MAbuffer-Occupancy is larger than the upper limit. This has the advantage that small packets are normally not dropped, but in the extreme case that most packets are small the total throughput can still be kept below the licensed level.

A simulation can be performed to determine how the method operates with a licensed capacity that varies over time, and the results of such a simulation are discussed below. The licence capacity was varied as follows:

| Time (seconds) | Licence capacity (Mbps) |
| --- | --- |
| 0-150 | 10 |
| 150-500 | 25 |
| 500-600 | Infinity |
| 600-700 | 10 |
| 700-800 | 20 |
| 800-900 | 30 |
| 900-1000 | 40 |

Three scenarios were simulated. In each case new users were started at intervals of 250/(maximum no. of users) seconds.

The performance of the three scenarios is compared in the following table:

|  | Small | Medium | Large |
| --- | --- | --- | --- |
| Downloaded traffic over TCP [Mbyte] | 2882.54 | 2934.86 | 2999.07 |
| # IP packets | 2312977 | 2325258 | 2513754 |
| # Dropped IP packets | 260684 | 252319 | 42095 |
| # TCP Timeouts | 55707 | 44812 | 2400 |
| # Fast retransmission & fast recovery | 90836 | 94715 | 21150 |

It is clear that there is no significant difference among the amount of downloaded data through TCP sessions. This means that, at application level, the performance of the proposed policing method does not depend significantly on the traffic model used. For the traffic models based on small and medium objects there are many more timeouts than for the traffic model based on large objects. This is probably because the TCPs are more sensitive for packet loss in a slow start phase.

Thus it can be seen that the policing method described keeps the licence rate well. For smaller object sizes the number of timeouts increases, and the deviation in the object bitrates gets larger. However, the TCP throughput does not significantly decrease.

The methods described above have the advantage that many PDRs are handled at the same time. Furthermore, packet delay is not increased, and the method is TCP friendly.

In addition to this, the methods described enable the RNC seller to offer lower capacity and thus avoid price pressure per Mbps ("pay as you grow"). It is possible to ensure that operators will not (perhaps unknowingly) load the RNC beyond verified levels. It is also possible to verify higher levels than Iub-max and then sell extra capacity. If the RNC licensing capacity method is never activated then the operator traffic must always be below the licensed rate. However, if the method is constantly activated then it provides an indication that the operator requires additional capacity.

The invention claimed is:

1. A method of controlling the rate of traffic flow through an Iub interface of a Radio Network Controller, the method comprising:
   obtaining a licensed rate at the Radio Network Controller, the licensed rate defining the maximum throughput permitted through the Iub interface;
   measuring the rate of traffic flow through the Iub interface and all Iu interfaces of the Radio Network Controller, distinguishing between Iu-cs and Iu-ps traffic and the Radio Network Controller reducing traffic flow through the Iub interface by a factor determined by $$\min\left(1, \frac{Iub - allowedLevel}{Iub} * \frac{Iu_{cs} + Iu_{ps}}{Iu_{ps}}\right)$$

where Iub $Iu_{cs}$ and $Iu_{ps}$ are Iub, Iu-cs and Iu-ps traffic throughput levels respectively and allowedLevel is the licensed rate;
   identifying the extent to which packet switched traffic flow through the Iub interface exceeds the licensed rate; and
   if the packet switched traffic flow through the Iub interface exceeds the licensed rate, dropping packets from traffic flow through the Iub interface to reduce the traffic flow to the licensed rate.

2. The method of claim 1, wherein the step of measuring the rate of traffic flow through the Iub and all Iu interfaces is carried out at periodic measurement intervals.

3. The method of claim 2, wherein, if the rate of traffic flow through the Iub interface drops below the licensed rate, packets continue to be dropped from the traffic flow through the Iub interface to reduce the traffic flow for a predetermined number of measurement intervals.

4. The method of claim 1, wherein packets are dropped from traffic flow through the Iub interface using a policing method based on a virtual buffer.

5. The method of claim 4, wherein upper and lower limits are defined for occupancy of the virtual buffer, the lower limit determined from a target rate based on the extent to which the traffic flow through the Iub interface exceeds the licensed rate.

6. The method of claim 5, wherein the virtual buffer occupancy is set to the lower limit when a decision is made that traffic flow should be reduced.

7. The method of claim 5, wherein the virtual buffer occupancy is increased whenever a packet is forwarded, the increase in occupancy corresponding to the size of the packet.

8. The method of claim 5, wherein the virtual buffer occupancy is decreased from a timer pulse by a factor determined by the period of the timer pulse multiplied by the target rate.

9. The method of claim 5, wherein a moving average for the virtual buffer occupancy is determined, and updated every time the virtual buffer occupancy changes.

10. The method of claim 9, wherein, when a packet arrives at the Radio Network Controller, the packet is forwarded if the moving average of the virtual buffer occupancy is smaller than the lower limit.

11. The method of claim 9, wherein, when a packet arrives at the Radio Network Controller, the packet is dropped if the moving average of the virtual buffer occupancy is larger than the upper limit.

12. The method of claim 9, wherein, when a packet arrives at the Radio Network Controller and the moving average of the virtual buffer occupancy is between the lower and upper limits, the packet is dropped with a probability determined by the extent to which the moving average of the buffer occupancy is higher than the lower limit.

13. The method of claim 12, wherein a packet below a predetermined size is forwarded when the moving average of the virtual buffer occupancy is between the lower and upper limits.

14. The method of claim 1, wherein the licensed rate obtained by the Radio Network Controller is modifiable by a capacity controller.

15. The method of claim 14, wherein the licensed rate is obtained by the Radio Network Controller by subscribing to a license key.

16. A Radio Network Controller comprising:
   a rate determining means for obtaining a licensed rate, the licensed rate defining the maximum throughput permitted through an Iub interface of the Radio Network Controller;
   a traffic flow rate measuring means for measuring the rate of traffic flow through the Iub interface and all Iu interfaces of the Radio Network Controller Controller; for distinguishing between Iu-cs and Iu-ps traffic and the Radio Network Controller reducing traffic flow through the Iub interface by a factor determined by $$\min\left(1, \frac{Iub - allowedLevel}{Iub} * \frac{Iu_{cs} + Iu_{ps}}{Iu_{ps}}\right)$$

where Iub, $Iu_{cs}$ and $Iu_{ps}$ are Iub, Iu-cs and Iu-ps traffic throughput levels respectively and allowedLevel is the licensed rate;
   a processing means for identifying the extent to which packet switched traffic flow through the Iub interface exceeds the licensed rate; and
   policing means for dropping packets from traffic flow through the Iub interface to reduce the traffic flow to the licensed rate if the packet switched traffic flow through the Iub interface exceeds the licensed rate.

17. The Radio Network Controller of claim 16, arranged to measure the rate of traffic flow through the Iub and all Iu interfaces at periodic measurement intervals.

18. The Radio Network Controller of claim 17, arranged so that, if the rate of traffic flow through the Iub interface drops below the licensed rate, packets continue to be dropped from the traffic flow through the Iub interface to reduce the traffic flow for a predetermined number of measurement intervals.

19. The Radio Network Controller of claim 16, arranged so that packets are dropped from traffic flow through the Iub interface using a policing method based on a virtual buffer.

20. The Radio Network Controller of claim 19, wherein upper and lower limits are defined for occupancy of the virtual buffer, the lower limit determined from a target rate based on the extent to which the traffic flow through the Iub interface exceeds the licensed rate.

21. The Radio Network Controller of claim 20, arranged so that the virtual buffer occupancy is set to the lower limit when a decision is made that traffic flow should be reduced.

22. The Radio Network Controller of claim 20, arranged so that the virtual buffer occupancy is increased whenever a packet is forwarded, the increase in occupancy corresponding to the size of the packet.

23. The Radio Network Controller of claim 20, arranged so that the virtual buffer occupancy is decreased from a timer pulse by a factor determined by the period of the timer pulse multiplied by the target rate.

24. The Radio Network Controller of claim 20, arranged to determine a moving average for the virtual buffer occupancy, the moving average being updated every time the virtual buffer occupancy changes.

25. The Radio Network Controller of claim 24, arranged so that, when a packet arrives at the Radio Network Controller, the packet is forwarded if the moving average of the virtual buffer occupancy is smaller than the lower limit.

26. The Radio Network Controller of claim 24, arranged so that, when a packet arrives at the Radio Network Controller, the packet is dropped if the moving average of the virtual buffer occupancy is larger than the upper limit.

27. The Radio Network Controller of claim 24, arranged so that, when a packet arrives at the Radio Network Controller and the moving average of the virtual buffer occupancy is between the lower and upper limits, the packet is dropped with a probability determined by the extent to which the moving average of the buffer occupancy is higher than the lower limit.

28. The Radio Network Controller of claim 27, arranged so that a packet below a predetermined size is forwarded when the moving average of the virtual buffer occupancy is between the lower and upper limits.

29. The Radio Network Controller of claim 16, wherein the licensed rate obtained by the Radio Network Controller is modifiable by a capacity controller.

30. The Radio Network Controller of claim 29, wherein the licensed rate is obtained by the Radio Network Controller by subscribing to a license key.

* * * * *

UNITED STATES PATENT AND TRADEMARK OFFICE
CERTIFICATE OF CORRECTION

PATENT NO. : 8,233,436 B2
APPLICATION NO. : 12/525753
DATED : July 31, 2012
INVENTOR(S) : Racz et al.

It is certified that error appears in the above-identified patent and that said Letters Patent is hereby corrected as shown below:

In Column 3, Line 37, delete "licence" and insert -- license --, therefor at each occurrence throughout the specification.

In Column 8, Line 5, in Claim 1, delete "lub" and insert -- Iub --, therefor at each occurrence throughout the claims.

In Column 8, Line 11, in Claim 1, delete "lu" and insert -- Iu --, therefor at each occurrence throughout the claims.

In Column 8, Line 12, in Claim 1, delete "lu-cs" and insert -- Iu-cs --, therefor at each occurrence throughout the claims.

In Column 8, Line 12, in Claim 1, delete "lu-ps" and insert -- Iu-ps --, therefor at each occurrence throughout the claims.

In Column 8, Line 21, in Claim 1, delete "lub" and insert -- Iub, --, therefor.

In Column 8, Line 21, in Claim 1, delete "lu$_{cs}$" and insert -- Iu$_{cs}$ --, therefor.

In Column 8, Line 21, in Claim 1, delete "lu$_{ps}$" and insert -- Iu$_{ps}$ --, therefor.

In Column 9, Line 22, in Claim 16, delete "Controller Controller;" and insert -- Controller; --, therefor.

Signed and Sealed this
Nineteenth Day of February, 2013

Teresa Stanek Rea
*Acting Director of the United States Patent and Trademark Office*